UNITED STATES PATENT OFFICE.

FREDERICK W. BRAUN, OF LOS ANGELES, CALIFORNIA.

PROCESS OF MANUFACTURING SOLID FERTILIZER.

1,058,145.　　　Specification of Letters Patent.　　Patented Apr. 8, 1913.

No Drawing.　　Application filed April 8, 1912.　Serial No. 689,417.

*To all whom it may concern:*

Be it known that I, FREDERICK W. BRAUN, a citizen of the United States, and a resident of Los Angeles, county of Los Angeles, and State of California, have invented certain new and useful Improvements in the Process of Manufacturing Solid Fertilizer, of which the following is a specification.

The invention relates to a process of manufacturing a solid fertilizer containing nitrogen and phosphoric acid.

The object of the invention is to provide an improved process of manufacturing solid fertilizer from phosphate rock, without the addition of any materials which produce valueless components in the finished product.

The phosphate rock which consists principally of tricalcic phosphate and calcium carbonate is ground to a suitable fineness and is mixed, in an acid resisting vessel, with a suitable amount of nitric acid to react with the tricalcic phosphate and calcium carbonate and produce mono-calcic phosphate and calcium nitrate, thereby supplying in the fertilizer two plant foods, namely nitrogen and phosphoric acid. The amount of nitric acid used with a given amount of phosphate rock is slightly less than that necessary to convert all of the tricalcic phosphate into mono-calcic phosphate, and all of the calcium carbonate into calcium nitrate so that an excess of acid will not be obtained in the finished product. After the mass has been mixed, it is agitated for a short time, approximately a few minutes and is then discharged from the vessel into a den or storage receptacle where it readily solidifies.

The relative amounts of phosphate rock and nitric acid used in the process depend upon the character of the rock and the strength of the acid. Using an acid which contains 54.78% pure nitric acid in combination with a phosphate rock that contains approximately 72.24% tricalcic phosphate, I use 1.3 pounds of the acid for every pound of powdered rock. The product obtained contains substantially 13.39% phosphoric anhydrid ($P_2O_5$) existing as mono-calcic phosphate 0.36% phosphoric anhydrid existing as bicalcic phosphate and 1.05% phosphoric anhydrid existing as tricalcic phosphate with about 7.0% nitrogen (N) which exists as calcium nitrate.

I claim:

1. The process of manufacturing solid fertilizer containing nitrogen and phosphoric acid which consists in mixing ground phosphate rock containing tricalcic phosphate with a sufficient amount of nitric acid to convert less than all of the tricalcic phosphate into mono-calcic phosphate.

2. The process of manufacturing solid fertilizer containing nitrogen and phosphoric acid which consists in mixing ground phosphate rock containing tricalcic phosphate and calcium carbonate with a sufficient amount of nitric acid to convert less than all of the tricalcic phosphate and calcium carbonate into mono-calcic phosphate and calcium nitrate respectively.

3. The process of manufacturing solid fertilizer containing nitrogen and phosphoric acid which consists in mixing ground phosphate rock containing tricalcic phosphate with a sufficient amount of nitric acid to convert less than all of the tricalcic phosphate into mono-calcic phosphate, agitating the mass, and allowing it to stand.

In testimony whereof, I have hereunto set my hand at San Francisco, California, this 2nd day of April 1912.

FREDERICK W. BRAUN.

In presence of—
　H. G. PROST,
　M. L. CONTE.